United States Patent [19]

Kato et al.

[11] 3,838,926

[45] Oct. 1, 1974

[54] METHOD OF CONTINUOUSLY DETERMINING THE ABSORBANCE LIGHT OF A CHEMICAL REACTION MIXTURE

[75] Inventors: Hisatoyo Kato; Nakao Oi, both of Kanagawa, Japan

[73] Assignee: Fuji Photo Film Co., Ltd., Nakanuma, Kanagawa, Japan

[22] Filed: Feb. 22, 1973

[21] Appl. No.: 334,548

[30] Foreign Application Priority Data
Feb. 23, 1972   Japan.............................. 47-18641

[52] U.S. Cl.................. 356/208, 250/228, 356/236
[51] Int. Cl.......................... G01n 21/26, G01j 1/04
[58] Field of Search.................... 356/201, 208, 236; 250/228

[56] References Cited
UNITED STATES PATENTS
2,707,900   5/1955   Maresh et al....................... 356/236
3,700,335   10/1972   Seelbinder........................ 356/201

FOREIGN PATENTS OR APPLICATIONS
675,911   5/1939   Germany............................ 356/208
192,183   10/1937   Switzerland........................ 356/208

Primary Examiner—Vincent P. McGraw
Attorney, Agent, or Firm—Sughrue, Rothwell, Mion, Zinn & Macpeak

[57] ABSTRACT

The progress of reaction in a turbid reaction mixture is continuously determined with high exactness by continuously determining the absorbance of the turbid reaction mixture passing through a flow cell enclosed in an integrating hollow globe, the inside surface of which reflects scattered light from the flow cell to eliminate the influence of the scattering of light due to the turbidity. This method is of value for continuous determination of the progress of a reaction especially in emulsion polymerizations and in the development of liquid photo emulsions for sensitometry. Apparatus to accomplish the method.

5 Claims, 8 Drawing Figures

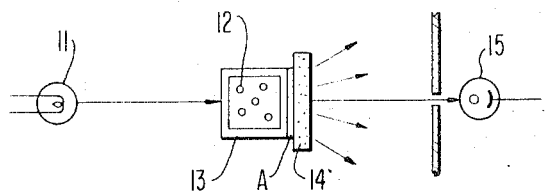
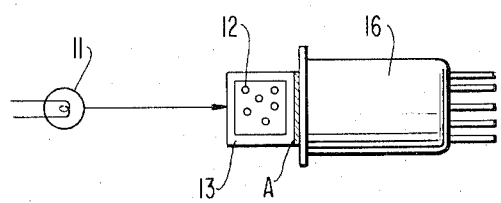
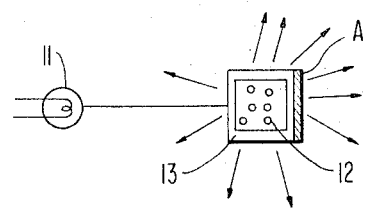
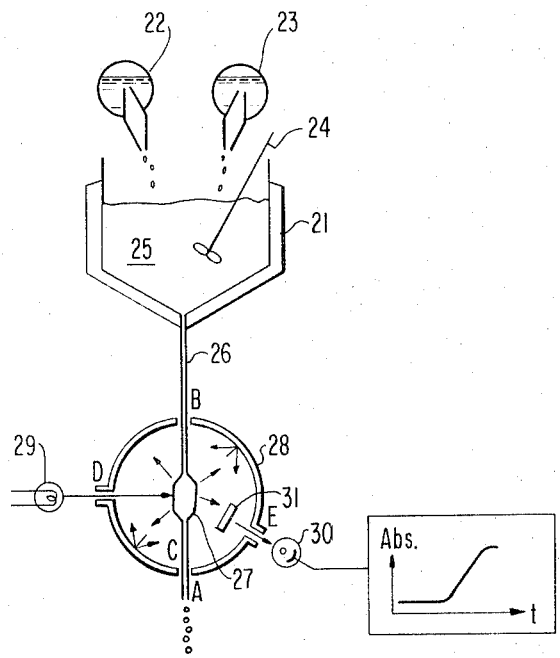
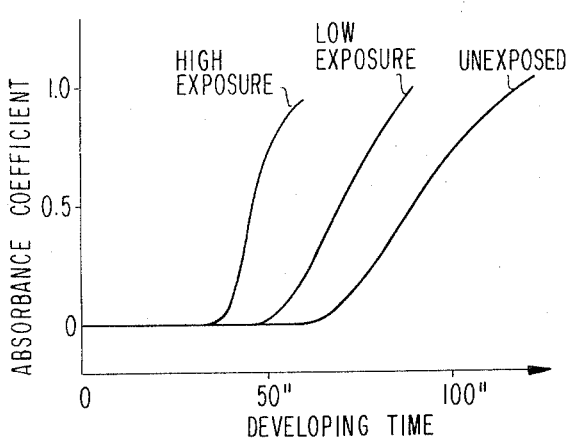

METHOD OF CONTINUOUSLY DETERMINING THE ABSORBANCE LIGHT OF A CHEMICAL REACTION MIXTURE

BACKGROUND OF THE INVENTION

1. FIELD OF THE INVENTION

This invention relates to a method and apparatus for continuously determining by optical means the progress of a chemical reaction system.

2. DESCRIPTION OF THE PRIOR ART

Absorption spectral analyses, such as absorbance analysis and infrared absorption spectral analysis, are well known in the art as one variety of instrumental analyses.

It is common to determine the progress of a chemical reaction in which the homogeneous phase is in the liquid state by continuously introducing a liquid sample from the reaction into a flow cell in an optical analyzer and continuously measuring variations in spectral absorption, absorbance or the like absorptions to thereby analyze, in an on-line system or automatically and continuously, variations in the color or optical density (absorbance) of the reaction mixture due to variations in the photo-absorption of the reaction product formed during the course of the reaction.

When the reaction system is of a homogeneous liquid phase which does not scatter light the variation in spectral absorption, absorbance or like photoabsorption by the substances in the reaction system can be accurately determined by the aforesaid method.

However, in contrast, in the case of chemical reaction systems where a homogeneous liquid phase in a liquid state is rendered turbid by gas, liquid and/or solid phases dispersed or suspended therein and a reaction is proceeding in the continuous phase or between different phases, it is difficult to accurately determine variations in photoabsorption because of scattering or reflection of light. Analysis of such a suspensoid or emulsoid system is thus difficult.

There have hitherto been proposed several methods of accurately determining the photoabsorption of such systems using an opal glass or a photoelectron multiplying tube of the head-on type, but these methods are still unsatisfactory and a method in which a reaction mixture is subjected to a determination of the photoabsorption after removal therefrom of light scattering material is not only of low accuracy but requires the complicated step of removing the light scattering material.

SUMMARY OF THE INVENTION

It is, accordingly, one object of the present invention to provide a method and apparatus for determining the state of a reaction by continuously determining with a high accuracy variations in the photoabsorption of a highly turbid liquid reaction mixture by eliminating the influence of light scattering materials.

It is another object of the present invention to provide a method and apparatus for quickly and accurately determining the quantity of photoabsorption by a turbid liquid reaction mixture without eliminating light scattering materials therefrom.

The above objects of the present invention are accomplished by a method and apparatus for continuously determining the quantity of light absorption which comprises continuously introducing portions of a liquid reaction mixture into a flow cell positioned in the interior of a hollow integrating globe and projecting a beam of light onto the flow cell while continuously measuring the absorption of light in the flow cell by the liquid.

BRIEF DESCRIPTION OF THE DRAWINGS

FIGS. 1 – 3 are schematic representations of typical prior art devices for measuring the light absorption of turbid liquids.

FIG. 4 is a schematic of one embodiment light absorption measuring device in accordance with the present invention.

FIG. 5 is a plot of light absorption obtained according to Example 1.

DETAILED DESCRIPTION OF THE INVENTION

Figure 6:
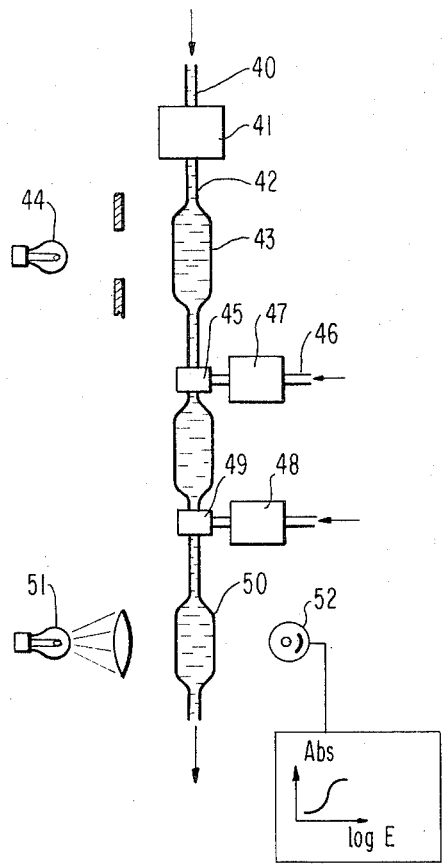
FIG. 6 is a light absorption measuring device of the prior art illustrating the object and effects of Example 2.

Various methods have hitherto been proposed for the determination of the quantity of light absorbed by samples of turbid liquids.

The term "turbid liquid" as is used in this specification means liquids consisting of a continuous liquid phase containing therein a suspended or emulsified phase having a high light scattering property, such as, e.g., milk, photoemulsions and milky lotions. As will be clear to one skilled in the art, the term "turbid liquid" cannot be completely objectively defined since so many types of such liquids are known. Generally speaking, however, many commonly encountered "turbid liquids" as this term is understood show an absorbance coefficient in the range of from about 0.1 to about 3.0 or higher. The present invention is not, by any means, limited to analyzing a turbid liquid showing such an absorbance coefficient.

The absorbance coefficient can be defined as $\log_{10}(I_o/I)$, where $I_o$ is the light strength of a light source and $I$ is the total light strength of transmitted light, scattered light and refracted light.

Typical prior art methods are illustrated hereinafter with reference to FIGS. 1 and 2 in the accompanying drawings.

In the drawings, FIG. 1 is a rough sketch of an assembly for use in the so-called opal-glass method. In the opal-glass method a beam of light radiated from a source of light 11 is projected onto one side of a transparent cell 13 containing a sample 12. An opal glass 14 is attached to the wall A of the cell through which the transmitted light exits the cell. The light transmitted through the sample 12 is uniformly scattered by the opal glass 14 and a portion of the light is measured by means of any suitable photoelectric converter 15. Even if the sample 12 is a turbid liquid, the quantity of light absorbed by the sample 12 can be determined without influence due to light scattering of the sample 12 because the transmitted light scattered by the sample is rendered uniform by the opal glass 14.

FIG. 2, where the reference numerals used have the same meaning as explained for FIG. 1, is a rough sketch of an assembly in which a photoelectron multiplying tube of the headon type 16 is attached to wall A of a sample cell 13 in place of the opal glass 14 in the assembly shown in FIG. 1. In this assembly, the light scattering due to sample 12 is eliminated by directly catching all the transmitted and scattered light by means of the tube 16.

These methods, however, are not satisfactory for specimens of turbid liquids having a very high light scattering property, i.e., in the case of turbid liquids of a very high light scattering property light from the source 11 is scattered in the specimen cell 13 not only towards the wall A but also towards the source 11 and in all directions perpendicular to the axis of the beam of light from the source 11. The effect of light being scattered in all directions through all the surfaces of the specimen cell 13 is shown in FIG. 3.

Thus, in the case of turbid liquids having a very high light scattering property, it is difficult to determine the absorbance of a specimen with sufficient accuracy according to the prior art because uniform light coming out of the cell is only measured in the direction of the wall A. In the case where almost all of light is scattered in directions other than towards the wall A, it is actually impossible to determine the quantity of light absorbed.

FIG. 4 is a rough sketch of an assembly illustrating an embodiment of the method of the present invention, the details of which assembly will be illustrated more fully below.

A portion of a turbid liquid reaction mixture 25 in a reaction vessel 21 during the course of reaction is continuously withdrawn from the vessel as a specimen liquid and continuously passed through a flow cell 27 located inside a hollow integrating globe 28. The liquid reaction mixture passed through the flow cell can be discharged from the system or, if appropriate, returned to the reaction system. In this embodiment, the liquid is discharged, as shown in FIG. 4.

The integrating globe 28 has in its wall two small holes D,E. A ray of light of a wave length range appropriate to the measurement from light source 29 is introduced into the flow cell 27 via hole D, and light rays unabsorbed by the specimen are integrated by means of the integrating globe 28 and withdrawn through the other small hole E (detecting hole) to enable the intensity of light by to be determined means of a receiver 30. It is necessary to provide a shading plate 31 to prevent detecting hole E from irradiation by strong reflected, scattered and transmitted light from the flow cell. Feeding or reflecting plate 31 thus serves the function of "cutting" strong light from impinging upon the photoreceiver. The receiver 30 may be located within the integrating globe 28, if desired, i.e., the receiver can be located at any position where the receiver can receive a light proportional to the total quantity of transmitted light, scattered light, and reflected light. Accordingly, it is possible to locate the receiver within the integrating globe 28, e.g., by placing the reciver into a cylinder, inserting the cylinder into the globe and providing a shading plate to prevent direct irradiation from the flow cell as in the case where the receiver is located outside the globe.

The term "flow cell" employed in this specification means a small cell having two openings for flowing therethrough a liquid specimen and an intermediate section transparent to light for determination of the light absorbance of the liquid specimen.

Though the shape and size of the intermediate transparent section of the flow cell for the measurement of the quantity of light absorbed by the specimen are not critical, it is necessary to determine appropriately the size depending on the conditions required because the proportions of transmitted light, scattered light and reflected light vary depending on the size or dimension and the proportions of these components vary when integrated by means of the integrating globe. Fortunately, the size of the intermediate transparent section of the flow cell does not have any great effect on the proportions of the transmitted light, scattered light and reflected light measured, and accordingly this factor is not overly critical in designing an appropriate measuring assembly. The scattering and reflection of light on the surface of the cell should be sufficiently eliminated by the aid of an appropriate coating and/or an appropriate choice of its shape since the surface and shape have a great influence on the accuracy of determination. The degree of elimination required will obviously depend upon the error permissible in the measurement, but generally, since one desires to perform as accurate a measurement as possible, an error of about 1 percent due to flow cell scattering in reflection should be achieved. Materials as can be used for this purpose are the same as those used to coat camera lens and like photographic lens, and usually have a refractive index of from about 1.0 to about 1.5.

The joints between the opening sections and intermediate section of the flow cell should be designed so that the liquid specimen flows therethrough without any turbulence or stagnation. Generally speaking, while it is impossible to completely avoid turbulence and stagnation as is known in the art of fluid dynamics, if one merely uses relatively smooth flow surfaces turbulence and stagnation are largely elimated.

The flow cell employed in the method of the present invention may be of any shape and of any material so long it satisfies the above mentioned conditions. An example of a suitable flow cells is a transparent glass flow cell as is used in a spectral photometer. In certain cases, there may be used, for simplicity, a common transparent glass tube. The two main critera which decide the material of which the flow cell is constructed are: (1). the material should not be degraded by the turbid liquid being analyzed; and (2) the material should transmit the wavelength of the measuring light. Thus, in any case where the turbid liquid being measured does not degrade common glass, a common transparent glass tube can be used as the flow cell.

Generally speaking, the intermediate section of the flow cell transparent to light is equivalent to the shape of the cell. Usually the cell presents an intermediate section transparent to light in a direction vertical to the direction of the direct light entering the hollow integrating globe, and the surface is plane. Preferably, the surface area of the intermediate section transparent to light is great since in this manner the amount of turbid liquid which receives the light is great and measurement error becomes lesser.

The term "integrating globe" in this specification means a hollow globe having an inside wall surface forming, ideally, a perfectly scattering reflective surface of uniform reflectivity. For practical purposes, the inside surface is coated with, e.g., titanium oxide or magnesium oxide (either could be used in the examples) to provide a dull, scattering finish. Though the shape of the inside surface is desirably spherical, it may be cylindrical or cubical or polyhedral in form so long as each corner is rounded. Since it is well known that no surface can provide 100 percent reflection, one naturally attempts to make the scattering reflection of the surface of the integrating globe as high as possible, and the general rule is that the higher reflection, the better.

As an example of a specific coating material which could be used to coat the interior of the integrating globe, there is "white reflectance paint" produced by Eastman Kodak Company. This is applied to the interior of the globe using a brush or spray apparatus.

It will be apparent to one skilled in the art that globes of various sizes can be used with equal success. For instance, in most examples the globe diameter was about 8cm. Usually, one will determine the globe diameter considering the size of the flow cell which must be in the interior of the globe, that is, one must consider the practical aspect of including the flow cell inside the globe, which flow cell may have to handle a fairly significant flow rate of turbid liquid to be analyzed. This aspect is quite practical, however, and will depend upon the exact measuring system contemplated. On the other hand, one would not wish to use a globe of excessive size because in this case one loses the advantage of a relatively compact apparatus.

Usually, so as to not overcrowd the interior of the hollow integrating globe the flow cell will be on the order of one-tenth the hollow integrating globe.

Reflecting or shading plate 31 can be placed in a number of positions within the globe. Usually, if the reflecting plate is placed about 1–2 cm. from exit E on a line between the center of the cell and the exit E this will suffice, and there is generally no need for excessive empirical determination of the best position for the reflecting plate 31. Of course, the exact position of the reflecting plate 31 will be determined by the size of the cell, the size of the exit E and the size of the reflecting plate 31. It will, of course, be obvious to one skilled in the art that the reflecting plate cannot be positioned so as to interfere with the direct light entering the flow cell.

It will, of course, be apparent to one skilled in the art that since direct light is cut by the reflecting plate 31, if the integrating globe is accurately manufactured the exact relationship between the entrance where the light enters the hollow integrating globe and the exit through which light leaves the globe are relatively unimportant.

Since all of the above factors can vary greatly depending upon the turbid liquid being measured, it may in certain instances be necessary to select different size flow cells and to vary the position of the reflecting plate 31, but this is easily done by a few process runs. Generally speaking, since the hollow integrating globe will be the most expensive item in the assembly this is usually a fixed factor.

The flow cell can theoretically be located in any position in the inner space of the integrating globe, though it is preferred to locate the intermediate section of the flow cell in the center of the globe from a practical point of view. The two opening sections of the flow cell which serve as the inlet and outlet for the liquid specimen usually extend outside the integrating globe wall through connecting tubes passed through the two openings A,B in the integrating globe. It is necessary to coat the opening sections of the flow cell or the connecting tubes with a scattering coating of the same kind as is applied to the inside surface of the integrating globe.

The wave length range of light used in the method of the present invention is not restricted to any special limits, and there may be used any kind of light, e.g., monochromic light or light having any wavelength distribution in the infrared, visible or ultraviolet region.

The coating applied to the inside surface of the integrating globe should be such that it uniformly reflects the light used for determination.

Thus, the advantages brought about by the method of the present invention are as follows:

1. Variations in quantity of light absorbed by a liquid reaction mixture can be continuously determined with accuracy in a turbid liquid reaction mixture during progress of a reaction without any influence due to light scattering by the liquid mixture. Consequently, it is possible to exactly determine the state of progress of a reaction by the continuous determination of variations in the quantity of light absorbed.

In the determination of the absorbance of a turbid liquid reaction mixture of very high scattering property by a conventional method one would generally dilute the liquid reaction mixture or make the wall of the flow cell as thin as possible. In this case, however, the value of the absorbance determined becomes small and the ratio of the reduction in intensity of light by scattering to that by absorbed (S/N ratio) is not improved.

In the method of the present invention, however, the S/N ratio is improved to a great extent since the reduction in the quantity of light scattered is minimized by integration of the scattered light by means of the integrating globe, which is not influenced by the concentration of the turbid liquid reaction mixture or the thickness or shape of the cell.

According to the present invention, the light absorption determination is attainable within a short time in a simplified way because dilution of a turbid liquid reaction mixture to be subjected to the determination is unnecessary, and the method of the present invention is of great value for quick continuous determinations on a rapidly varying turbid liquid reaction mixture and on a turbid liquid reaction mixture which will vary in properties with dilution (see Examples 1 and 2).

In addition, no critical design is necessary for the shape of the intermediate section of a flow cell, and ordinary flow cells may suitable be used.

2. In accordance with the method of the present invention, every sort of light absorption determination is attainable at low cost without any difficulty irrespective of the variety of light and without any special devices, such as accomplish the spectral absorption of infrared, visible or ultraviolet rays or the absorbance of white light.

The method of the present invention may be accomplished using any conventional spectral photometer or absorption photometer.

3. The combination of a flow cell and an integrating globe makes it easy to carry out the determination automatically and in an on-line system; this permits automatic control of the reaction.

4. The step of eliminating light scattering material is unnecessary, so that the apparatus for determination is simplified and the determination is performed rapidly with improved accuracy (see Example 2). The elimination of light scattering material in a conventional process is attained by extraction, the addition of reagents, precipitation, centrifugal separation, filtration or like troublesome means. The fact such are not needed in the present invention is of great value, particularly for a continuous determination of the absorbance of a turbid liquid reaction mixture in which reaction proceeds very quickly.

5. Since the determination of absorbance is made on a liquid reaction mixture continuously passing through a flow cell and the flow of the liquid prevents aggregation and precipitation of the suspensoid, improved results are obtained compared with determination methods in which the determination of absorbance is made on a liquid reaction mixture collected in a non-flow cell.

6. It is unnecessary to provide the integrating globe with a special lid or cap for inserting and removing a cell as would be the case with a non-flow cell since in an assembly for use in the practice of the present invention a liquid specimen is passed through the flow cell fixed in the hollow integrating cell. Accordingly, the inside wall of the integrating globe is not contaminated or otherwise injured and the determination is attainable in a simple manner with rapidity and high accuracy.

7. The method of the present invention is, of course, applicable to determination of the absorbance of a non-scattering non-turbid liquid reaction mixture or of a liquid reaction mixture which becomes turbid or non-turbid in the course of reaction.

The present invention will now be illustrated in more detail by following examples.

Unless otherwise indicated the apparatus used in the examples had the following measurements:

Integrating globe inner diameter: 8cm; position of the reflecting light plate: 1cm from the light exit on a line connecting the light exit and the center of the flow cell; light plate: circular with 2cm diameter; light entrance: circular — 1 cm in diameter; light exit: circular — 1cm in diameter; transparent section of the flow cell: 8mm × 5mm (width × height); flow cell connecting conduits: 3mm inner diameter flow cell — centered in globe. If a different measurement is present in the examples, unless otherwise indicated all other measurements remain as given above.

EXAMPLE 1

Continuous Determination of Progress of the Development of a Photoemulsion

Methods are known of continuously determining the progress of the developing reaction in a liquid photoemulsion having added thereto a developing solution. It will be obvious to one skilled in the art that in the measuring of highly turbid liquids, best measurements are made where the turbidity is due to smaller particle size materials.

However it is difficult to make an accurate determination by the methods of the prior art because of the high degree of light scattering in the photoemulsion and the impossibility of separating light scattering by the emulsion and light absorption by reduced silver. This difficulty has heretofore been avoided by diluting the photoemulsion with either water or an aqueous gelatin solution to a concentration suitable for the determination of the quantity of absorbed light. Depending on the initial concentration, the emulsion will generally be diluted at most to about 1,000 times its original volume. However, though the number of particles of silver halide per unit volume of the emulsion is [and accordingly, the light scattering (decrease in intensity of light by scattering)] decreased by the dilution, the quantity of light absorbed by developed or reduced colloidal silver is also reduced to make the determination difficult from the view point of photometric techniques. When light is used for determination which is of a wavelength in the sensitive region of the emulsion the determination is practically impossible no matter how much the emulsion is diluted because of a very high degree of scattering of light by the emulsion, especially with silver halide particles of a size of 0.05 to 1 micron.

The dilution of the emulsion also results in changes in the pH, $p$Ag, conductivity and other chemical properties of the emulsion and basically alters the essential properties of the emulsion. It is possible, of course, to maintain the inherent chemical properties of the emulsion by means of, e.g., appropriate additives, but this is difficult so that it is desirable to process the emulsion in its unaltered state. Even if the dilution is made, a ratio of the decrease of scattering light quantity and that of light absorption quantity caused by the said dilution is constant and therefore S/N ratio is not changed, resulting in not improving the measurement accuracy.

These problems have been successfully overcome by the method of the present invention.

In FIG. 4 there is shown a rough sketch of an apparatus employed in one embodiment of the method of the present invention, which embodiment will hereinafter be illustrated in detail.

Into a jacketed tank 21 is fed a gelatin AgIBr emulsion (held in tank 22) which contains particles of silver iodide of an average particle size of 0.3 microns which has been diluted to 50 times its original volume with an aqueous gelatin solution (original composition: Ag I:1.02 mol percent, $AgNO_3$:121.2g/kg; gelatin 115.1g/kg; diluted with 3 wt. percent aqueous gelatin solution). The diluted emulsion is, if necessary, exposed for a determined time to light from a source of light (unshown) positioned over the tank 21 while uniformly stirring by means of a stirrer 24.

A PQ developing solution 23 equivalent in quantity to the diluted emulsion 22 is then fed into the tank 21 from tank 23 (PQ developing solution comprises 1-phenyl-3-pyrazolidone and hydroquinone as the developing agents). By the reaction between the emulsion 22 and the developing solution 23 there is formed reduced silver which begins to darken the solution as the reaction proceeds. The solution is highly light scattering and turbid due to the silver halide particles and the reduced silver particles. The liquid reaction mixture 25 of the emulsion 22 and developing solution 23 is, without adding thereto any fixing or stopping solution, continuously fed from the bottom of the tank 21 through a feed pipe 26 into a flow cell 27 via hole B and continuously discharged from the opening A. The flow cell 27 is fitted within the inside of an integrating globe 28 of an inner diameter of 100 mm, as shown in FIG. 4. The two openings of the flow cell 27 are interconnected with the exterior at positions B and A on the globe. In this state, light of a prescribed wavelength (which may be of a wavelength within the sensitive range of the emulsion) is directed from light source 29 to the center section of the flow cell 27. Portions of the light other than that absorbed by the liquid reaction mixture flowing through the flow cell 27 are uniformly scattered by the integrating globe 28. A portion of the uniformly scattered light is withdrawn through the detecting hole E in the integrating globe 28 and subjected to a photometric measurement by means of a receiver 30. A shading plate 31 is positioned between the flow cell 27 and the detecting hole E to prevent direct light from the flow cell 27 streaming into the detecting hole E. In this way, the quantity of light absorbed only by the darkened emulsion is calculated directly from the photometric value determined by the receiver 30 since scattered light is measured together with light transmitted through the flow cell 27.

The course of the development reaction in the emulsion, namely the formation and growth of particles of reduced silver, can be continuously determined with time by carrying out the determination of absorbance from a point just after the mixing of the liquid photoemulsion and the developing solution.

As will be apparent to one skilled in the art, the upper limit of the flow rate of the turbid liquid being measured in accordance with the present invention is necessarily decided by the viscosity of the turbid liquid and the diameter of the pipe between the reaction tank and the flow cell and the roughness of the inner surface of the pipe and flow cell.

Obviously, the lower limit of the flow rate should not be set so as to be so low that undue reaction occurs between the departure from the reaction tank and the measurement itself. For instance, if the time is too long it is feasable that the reaction could be completed prior to measurement. It is generally a matter of common sense in the art involved as to the time for passage between the reaction tank and the measurement station. With a relatively slow reaction, the time will be of such little importance that little attention need be given to this aspect of the invention. On the other hand, with a rapid reaction one generally will attempt to make the time of passage between the reaction tank and the measurement station as low as possible. For instance, with a photographic developing which takes 1 minute, generally one would take no longer than about 10 – 20 seconds between the reaction tank and the measurement station.

Irrespective of the photosensitivity of the emulsion, the determination in accordance with the embodiment of this example may be performed using light of any wavelength, i.e., ultraviolet, visible or infrared rays. This is because even if the emulsion is sensitive to the light used for the measurement the mixture of the emulsion and developing solution is flowing through the flow cell and is immediately discharged therefrom after being subjected to the measurement and thus the measurement light does not have any effect on the measurement.

In FIG. 5 there is shown the results obtained by a determination using light of a wave length of 600 millimicrons. The three curves in the graph indicate differences in the rate of progress of a development due to differences in the exposure given to each emulsion. In FIG. 5 the vertical axis represents the absorbance coefficient and the horizontal axis represents the developing time in seconds.

The value of absorbance at the initiation of development is 0 because the effect of light scattering by silver halide particles is eliminated.

When 100 cc of a gelatin-silver iodide emulsion having a particle size distribution ranging from 0.2 microns to 0.5 microns is (without dilution) developed with 500 cc of a MQ developing solution (MQ developing solution contains hydroquinone and 1,4-methyl-p-aminophenol sulfate as the developing agents) in a similar manner, there is obtained a developing curve similar to that shown in FIG. 5.

As will be understood by the above description, the course of the formation and growth of colloidal silver in the development of an emulsion of any particle size can easily and rapidly be determined with high accuracy by combining the method of the present invention with the method which we have proposed in Japanese Pat. application (laid open to public inspection) OLS 85220/1973 15774 for the continuous determination of the progress of a development in a photoemulsion, without any sacrifice in the advantages of the method disclosed in Japanese Pat. application OLS 85220/1973.

EXAMPLE 2

Determination of the Characterisitc Curve of a Liquid Photoemulsion

Methods of determining the so called characteristic curves indicating changes in darkness of developed image or optical density versus changes in the quantity of exposure are well known, as disclosed in U.S. Pat. No. 2,590,830.

Illustrating the prior methods with reference to FIG. 6, a liquid emulsion to be measured is introduced at a constant flow rate from conduit pipe 40 through a pump 41 into a reaction tube 42. The emulsion exposed in an exposing section 43 to light from source 44 is mixed with a developing solution introduced from conduit pipe 46 by means of pump 47 through mixer 45 into the reaction tube to effect development. After a determined developing time, a fixing solution is introduced by means of pump 48 through mixer 49 into the reaction tube to stop the developing reaction and the optical density of the thus developed emulsion is determined as it passes through a measuring section 50 in the form of a flow cell by irradiating it by light source 51 and measuring the intensity of transmitted light by means of a receiver or photometer 52. If the quantity of exposure to the light source 44 is continuously varied, the optical density correspondingly varies and is measured by means of the photometer 52 continuously to give a characteristic curve.

This prior art method has the same drawback discussed in Example 1, i.e., it is necessary to dilute the emulsion because of its high light scattering property. In this prior art method it is unavoidable to add a fixing solution at the end of development to minimize any error in measurement due to light scattering by particles of silver halide in the emulsion, especially in the case of emulsions in which the particles of silver halide are of a size of 0.05 to 1 micron (because of the higher light scattering property thereof) because the high degree of light scattering by the particles of silver halide makes it impossible to measure the absorption of light by reduced silver. In this prior art method it is impossible to eliminate the influence of light scattering by particles of reduced silver however many particles of silver halide are eliminated by fixing. One must properly dilute the emulsion as long as the determination of optical density is to be made on the basis of transmitted light.

These difficulties have been overcome at one stroke in accordance with the method of the present invention. In the method of the present invention the step of fixing is unnecessary and this leads to a shortening of the measuring time, a simplified measuring apparatus and improved accuracy in measurement. The lack of need for dilution of the emulsion makes it possible to more directly ascertain the inherent properties of the emulsion, to shorten the measuring time and to employ simplified apparatus.

Figure 7:
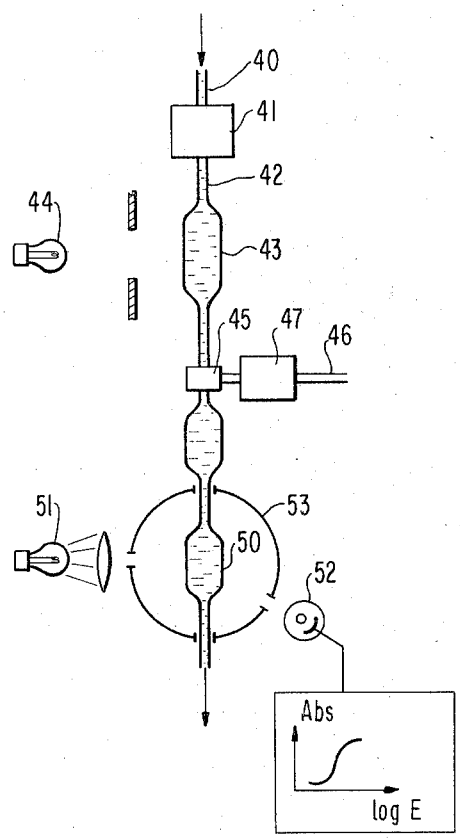
FIGS. 7 and 8 are light absorption measuring devices in accordance with the present invention FIG. 8 illustrating the apparatus used in Example 3.

Illustrating another embodiment of the method of the present invention with reference to FIG. 7, which is a rough sketch of apparatus to be used for the practice of the method of the present invention, a liquid photoemulsion and a developing solution mixed together by means of mixer 45 are, after a determined developing time, introduced into an optical density measuring section 50 in the form of a flow cell positioned inside and integrating globe 53. Irradiating the cell with light from light source 51, all the scattered light and transmitted light are integrated and measured by means of a photometer 52. All other reference numerals have the same meaning as given in FIG. 6.

In this method it is unnecessary to employ a fixing or stopping solution because if irradiation by light from the light source 51 causes further development it has no effect on the determination for the same reason as described in Example 1.

In this embodiment, the apparatus is simplified and accuracy of determination is improved because of the omission of the fixing step.

EXAMPLE 3

Continuous Determination of Organic Material Contained in a Waste Liquor

It is common practice to determine the quantity of organic material contained in a waste liquor by adding potassium bichromate or potassium permanganate and determining the quantity of potassium bichromate or permanganate consumed for oxidation of the organic material by means of a colometer. However, in this method, the turbidity of the waste liquor due to earth and sand and other inorganic fine particles suspended therein makes it difficult to determine the colormetric density with high accuracy.

Figure 8:
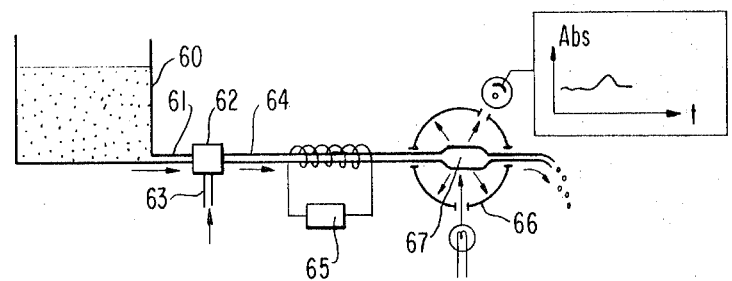

The method of the present invention is of great value for the continuous determination of the organic material content of such waste liquors, and FIG. 8 is a rough sketch of apparatus used for such an analysis.

Referring to FIG. 8, from a reservoir for waste liquor 60, a waste liquor is introduced through conduit 61 into a mixer 62 in which the waste liquor is mixed with an aqueous solution of potassium bichromate or permanganate introduced thereinto through conduit 63 in a fixed proportion. The mixed solution is passed through a reaction tube 64 in which oxidation of organic material by the potassium bichromate or permanganate progresses. The reaction tube is preferably equipped with a heating means 65 for promoting the oxidation to the end point. The mixed solution is then passed through a flow cell 67 positioned in the interior of an integrating globe 66 identical to that heretofore described, i.e., inner diameter of 8cm, as shown in FIG. 4 fitted to the end of the reaction tube and then discharged through another opening of the flow cell.

The flow cell assembly in this apparatus is mounted on a stand for cell as in used in an ordinary colormeter to carry out colormetric determinations to determine the quantity of consumed potassium bichromate or permanganate.

In this embodiment of the method of the present invention the change in the content of organic material in a waste liquor can be continuously determined since the determination is conducted with a continuously flowing waste liquor in a pipe line.

EXAMPLE 4

Continuous Determination of the Progress of a Emulsion Polymerization of Butadiene A 2 liter round-bottomed flask is equipped with a condenser, a stirrer, a conduit for the introduction of gaseous nitrogen, a thermometer and a silica flow cell mounted in an integrating globe. A pump is fitted between the flow cell and the flask for introducing a reaction mixture into the flow cell and returning it to the flask.

The flask is then charged with 200 g of purified butadiene, 400g of water, 10 g of sodium dodecylsulfate, 0.5 g of benzoyl peroxide, 1.4g of ferrous ammonium sulfate hexahydrate and 60 g of sodium pyrophosphate decahydrate, put in a thermostat assembly maintained at 40°C and purged of air with gaseous nitrogen while stirring the contents to start polymerization.

The polymerization is completed in 1 hour. During the course of the polymerization, the absorbance of ultraviolet rays of a wave length of from 200 millimicrons to 370 millimicrons by the polymerization mixture in the flow cell is continuously determined by an ultraviolet spectroscope. It is observed that the absorbance of light of a wavelength of about 220 millmicrons decreases with elapsed time. This is believed to be attributable to a decrease in the concentration of conjugated double bond in butadiene with elapsed time or the advance of the polymerization. Thus, the conversion of butadiene with progress of the polymerization can be continuously determined.

Generally speaking, distilled water is used to wash the flow cell of the present invention. When the flow cell is filled with such distilled water the absorbance is set to be 0. When the light source is turned off, the absorbance is set to be 100 percent. The absorbance coefficients of these two conditions are 0 and infinity, respectively.

In accordance with the method of the present invention, it is possible to determine changes in ultraviolet or infrared spectral absorption by a reaction mixture on any emulsion or suspension polymerization system in addition to the emulsion polymerization of butadiene without being influenced by the turbidity of the system.

While the invention has been described in detail and with reference to specific embodiments thereof, it will be apparent to one skilled in the art that various changes and modifications can be made therein without departing from the spirit and scope thereof.

What is claimed is:

1. A method of determining the quantity of absorption of light by a turbid liquid photographic emulsion reaction mixture containing silver halide particles of $0.05\mu$ to $1\mu$ comprising irradiating the reaction mixture and measuring the absorption of light, wherein the improvement comprises continuously flowing the reaction mixture into a flow cell positioned in the inner hollow of an integrating globe and spaced from the walls thereof from a reaction vessel, irradiating the flow cell by light for the determination and continuously measuring the absorption of light by the liquid in the flow cell.

2. The method of continuously determining the extent of progress of development in a liquid photoemulsion comprising adding a developing solution to the liquid photoemulsion and, without adding thereto any fixing or stopping solution, subjecting the emulsion to determination of absorption of light in the method as defined in claim 1 using light to which the photoemulsion is sensitive as the aforesaid light for determination.

3. The method of continuously determining the darkness of the liquid photo emulsion versus quantity of exposure comprising continuously passing the emulsion through a conduit, exposing the emulsion in the conduit to light in a varying quantity, mixing the exposed emulsion with a developing solution in a defined proportion to effect development, progressing development of the emulsion for a defined time as the emulsion passes through the conduit and immediately thereafter subjecting the emulsion to determination of absorption of light in the method as defined in claim 1.

4. The method of claim 2 further comprising diluting said liquid photoemulsion, prior to the adding of the developing solution.

5. The method of claim 3 further comprising diluting the liquid photo emulsion prior to mixing with the developing solution.

* * * * *